(12) United States Patent
South et al.

(10) Patent No.: US 9,462,136 B2
(45) Date of Patent: Oct. 4, 2016

(54) SYSTEMS AND METHODS FOR SELECTING AND USING AN ORIGINATION IDENTIFIER IN AN INTERNET PROTOCOL ENVIRONMENT

(75) Inventors: Michael South, Jackson, NJ (US); John Erickson, Freehold, NJ (US); Andrew James McSherry, East Point, GA (US)

(73) Assignee: Vonage America Inc., Holmdel, NJ (US)

( * ) Notice: Subject to any disclaimer, the term of this patent is extended or adjusted under 35 U.S.C. 154(b) by 1292 days.

(21) Appl. No.: 12/841,258

(22) Filed: Jul. 22, 2010

(65) Prior Publication Data
US 2011/0319055 A1    Dec. 29, 2011

Related U.S. Application Data

(63) Continuation of application No. 12/822,970, filed on Jun. 24, 2010.

(51) Int. Cl.
*H04M 3/42* (2006.01)
*H04M 1/15* (2006.01)
(Continued)

(52) U.S. Cl.
CPC ............ *H04M 15/31* (2013.01); *G06Q 30/04* (2013.01); *H04L 12/14* (2013.01); *H04L 12/1457* (2013.01); *H04L 29/12754* (2013.01); *H04L 29/12896* (2013.01); *H04L 45/00* (2013.01); *H04L 61/106* (2013.01); *H04L 61/157* (2013.01); *H04L 61/2069* (2013.01); *H04L 61/3085* (2013.01); *H04L 61/605* (2013.01); *H04L 65/1069* (2013.01); *H04L 65/4038* (2013.01); *H04L 65/4061* (2013.01); *H04M 3/42263* (2013.01); *H04M 3/465* (2013.01);
(Continued)

(58) Field of Classification Search
CPC ................. H04M 3/42068; H04M 3/42059
USPC ......... 370/252, 395.2, 259, 496; 379/114.03, 379/114.22, 114.21, 114.28, 121.03, 379/127.01, 127.05, 127.06, 15.02, 15.03, 379/88.19, 88.11, 88.2, 88.21, 142; 455/406, 405, 466, 414.1, 415
See application file for complete search history.

(56) References Cited

U.S. PATENT DOCUMENTS 5,222,125 A * 6/1993 Creswell et al. ......... 379/114.05
5,774,533 A * 6/1998 Patel ........................ 379/127.03
(Continued)

FOREIGN PATENT DOCUMENTS

EP    2009846    12/2008
WO   99/26434    5/1999

OTHER PUBLICATIONS

Invitation to Pay Additional Fees and Partial International Search Report issued in PCT/US2011/041742 on Oct. 5, 2011.

*Primary Examiner* — Wutchung Chu
(74) *Attorney, Agent, or Firm* — Nixon & Vanderhye, P.C.

(57) ABSTRACT

A IP telephony service allows customers to form user groups. Each user group can include multiple members, each of whom have their own telephony device. A group identifier, which could be a telephone number, is assigned to each user group. As a result, a single telephony device belonging to a member of a user group can be associated with its own unique telephone number, and the telephone number used as the group identifier. The system allows the user to select which of multiple telephone numbers associated with his telephony device are to be used as the originating telephone number when an outgoing telephone call or an outgoing message is sent.

19 Claims, 9 Drawing Sheets

(51) Int. Cl.
| | |
|---|---|
| H04M 15/00 | (2006.01) |
| G06Q 30/04 | (2012.01) |
| H04L 12/14 | (2006.01) |
| H04L 29/12 | (2006.01) |
| H04L 12/701 | (2013.01) |
| H04M 3/46 | (2006.01) |
| H04M 7/00 | (2006.01) |
| H04L 29/06 | (2006.01) |

(52) U.S. Cl.
CPC ........... *H04M 7/0024* (2013.01); *H04M 15/00* (2013.01); *H04M 15/56* (2013.01); *H04M 15/765* (2013.01); *H04M 15/7652* (2013.01); *H04M 15/77* (2013.01); *H04M 15/771* (2013.01); *H04M 15/773* (2013.01); *H04M 15/774* (2013.01); *H04M 15/8016* (2013.01); *H04M 15/8033* (2013.01); *H04M 2203/2044* (2013.01)

(56) References Cited

U.S. PATENT DOCUMENTS

| | | | |
|---|---|---|---|
| 6,253,074 B1* | 6/2001 | Carlsson et al. | 455/414.2 |
| 2002/0022472 A1* | 2/2002 | Watler et al. | 455/405 |
| 2007/0123279 A1* | 5/2007 | Starling et al. | 455/466 |
| 2007/0298771 A1* | 12/2007 | Mottes | 455/414.1 |
| 2008/0139230 A1* | 6/2008 | Mottes | 455/466 |
| 2011/0177797 A1* | 7/2011 | Vendrow et al. | 455/414.1 |
| 2011/0194680 A1* | 8/2011 | Mourya | H04M 3/42042 379/142.04 |
| 2011/0287748 A1* | 11/2011 | Angel et al. | 455/414.1 |

* cited by examiner

SYSTEMS AND METHODS FOR SELECTING AND USING AN ORIGINATION IDENTIFIER IN AN INTERNET PROTOCOL ENVIRONMENT

This application is a Continuation of application Ser. No. 12/822,970, filed Jun. 25, 2010, the entire content of which is incorporated herein by reference.

BACKGROUND OF THE TECHNOLOGY

The technology is related to Voice over Internet Protocol (VOIP) telephone systems which connect telephone calls to or from devices using data packet communications. In a typical VOIP system, users can place and receive telephone calls using IP based telephones, computers running IP telephony software, or via a normal analog telephone which is connected to the Internet via a telephone adapter. In each of these instances, the device which sends and receives data packets over a network has a device identification number. The device identification number is used by the VOIP telephony service to help route calls to the appropriate devices.

For example, assume that a customer of a VOIP telephony service utilizes an IP telephone to place and receive telephone calls. When another party calls the customer's telephone number, the call is initially routed to the VOIP telephony service provider. The VOIP telephony service uses the dialed telephone number to determine the identification number of the customer's IP telephone. The VOIP telephony service provider then connects the call to that IP telephone.

In such a system, each customer's telephone number is typically associated with the identification number of only a single IP telephony device. In some instances, a single telephone number may be associated with multiple IP telephony devices. However, each of those IP telephony devices would be associated with a single customer or user account. In other words, there is a one-to-one correspondence between telephone numbers and users/accounts.

In those instances where a customer has multiple IP telephony devices associated with a single telephone number, when a call is received for that customer, the VOIP telephony service might ring all of the customer's telephony devices at the same time, and then connect the call to whichever device answers first. Alternatively, the VOIP telephony service might ring one of the customer's telephony devices first, based on call handling instructions. If the first device does not answer the call, the VOIP telephony service might then ring the second device.

DETAILED DESCRIPTION OF PREFERRED EMBODIMENTS

Figure 1:
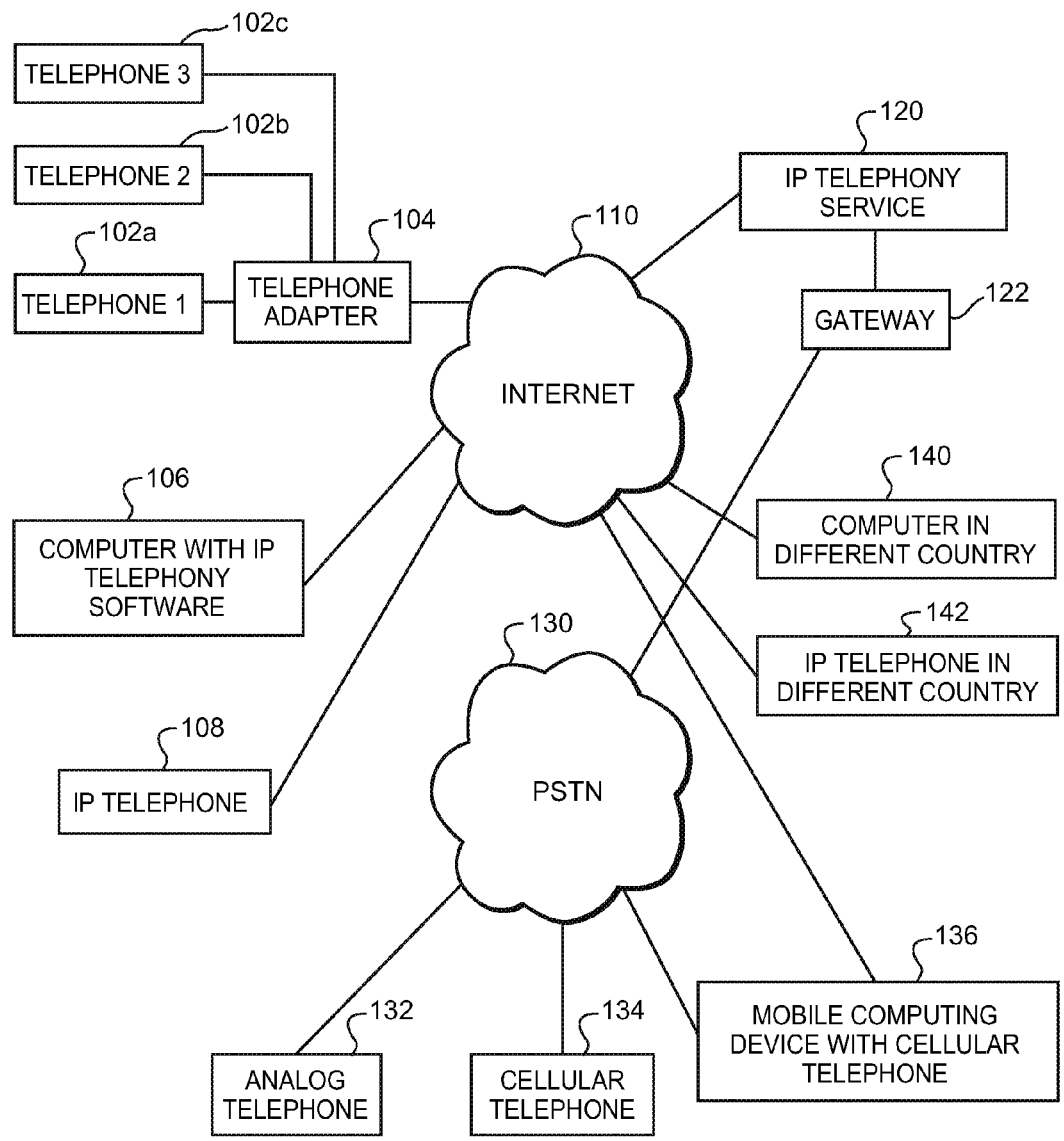
FIG. 1 is a diagram of various elements which may be associated with a VOIP telephony system and a typical PSTN.

Various different elements which can be a part of a VOIP telephony system are illustrated in FIG. 1. As shown therein, an IP telephony service 120 enables connection of telephone calls between its own customers and other parties via data communications that pass over a data network. As illustrated in FIG. 1, the data network is commonly the Internet. The IP telephony service 120 is connected directly to the Internet 110. In addition, the IP telephony service 120 is connected to the publicly switched telephone network (PSTN) 130 via a gateway 122.

The gateway 122 allows users and devices that are connected to the PSTN to connect with users and devices that are reachable through the IP telephony service 120, and vice versa. In some instances, the gateway would be a part of the IP telephony service 120. In other instances, the gateway 122 could be maintained by a third party.

Customers of the VOIP telephony service 120 can place and receive telephone calls using an IP telephone 108 that is connected to the Internet 110. Such an IP telephone could be connected to an Internet service provider via a wired connection or via a wireless router. In some instances, the IP telephone 108 could utilize a cellular telephone system to access the Internet.

Alternatively, a customer could utilize a normal analog telephone 102a which is connected to the Internet 110 via a telephone adapter 104. The telephone adapter converts analog signals from the telephone into data signals that pass over the Internet 110, and visa versa. Also, as illustrated in FIG. 1, multiple analog telephones 102a, 102b and 102c could all be coupled to the same telephone adaptor 104. This configuration is common where all of the analog telephones 102a, 102b and 102c are located in a residence or business, and all of the telephones are connected to the same telephone adapter. With this type of a configuration, all of the analog telephones 102a, 102b, 102c share the same telephone number assigned to the telephone adaptor 104.

In addition, a customer could utilize a soft-phone client running on a computer 106 to place and receive IP based telephone calls, and to access other IP telephony services. In some instances, the soft-phone client could be assigned its own telephone number. In other instances, the soft-phone client could be associated with a telephone number that is also assigned to an IP telephone 108, or to a telephone adaptor 104 that is connected one or more analog telephones.

A third party using an analog telephone 132 which is connected to the PSTN 130 may call a customer of the VOIP telephony service 120. In this instance, the call is initially connected from the analog telephone 132 to the PSTN 130, and then from the PSTN 130, through the gateway 122 to the VOIP telephony service 120. The VOIP telephony service 120 would then route the call to the customer's IP telephony device. A third party using a cellular telephone 134 could also place a call to a VOIP telephony service customer, and the connection would be established in a similar manner, although the first link would involve communications between the cellular telephone 134 and a cellular telephone network. For purposes of this explanation, the cellular telephone network is considered part of the PSTN 130.

In addition, mobile computing devices which include cellular telephone capabilities could also be used to place telephone calls to customers of the VOIP telephony service. A mobile computing device 136 as illustrated in FIG. 1 might connect to the PSTN 130 using its cellular telephone capabilities. However, such devices might also have the ability to connect wirelessly via some other means. For instance, a mobile computing device 136 might communicate with a wireless data router to connect the mobile computing device 136 directly to a data network, such as the Internet 110. In this instance, communications between the mobile computing device 136 and other parties could be entirely carried by data communications which pass from the mobile computing device directly to a data network 110. Of course, alternate embodiments could utilize any other form of wireless communications path to enable communications.

Users of the IP telephony service 120 are able to access the service from virtually any location where they can connect to the Internet. Thus, a customer could register with an IP telephony service provider in the U.S., and that customer could then use an IP telephone 142 located in a country outside the U.S. to access the services. Likewise, the customer could also utilize a computer 140 outside the U.S. that is running a soft-phone client to access the IP telephony services.

Figure 2:
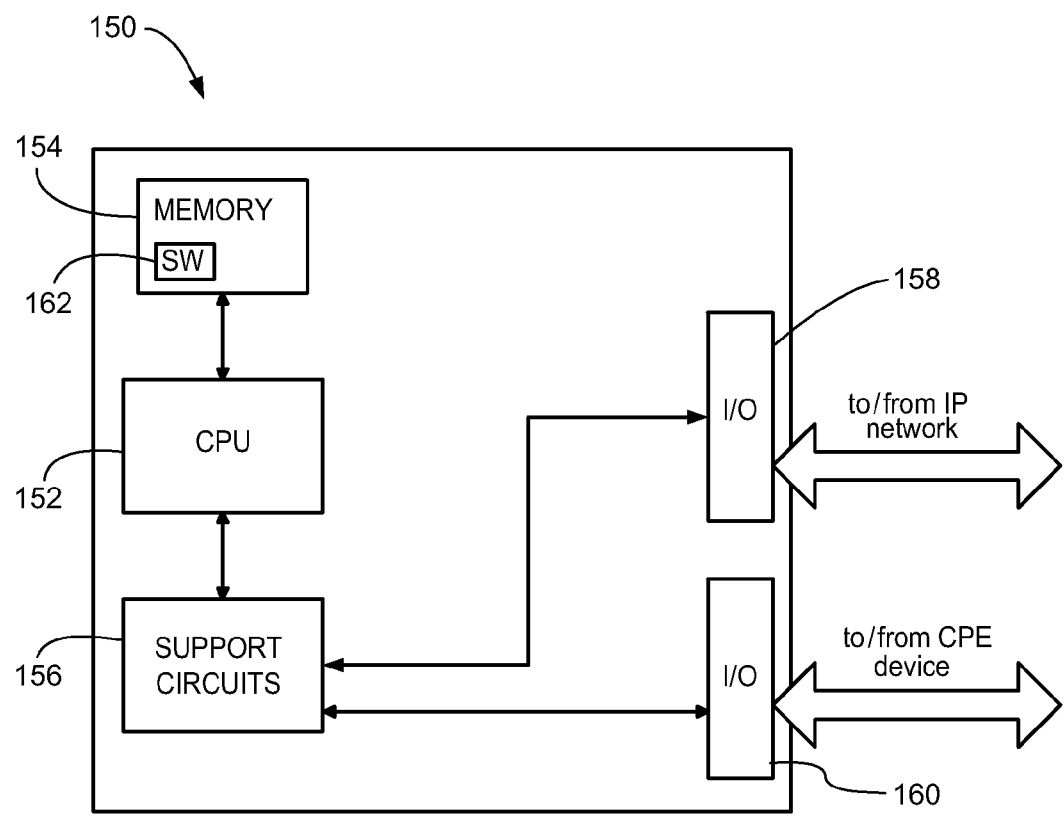
FIG. 2 is a diagram of various elements of a processor which can be part of a VOIP telephony system.

FIG. 2 illustrates elements of a computer processor that can be used as part of the VOIP telephony service 120 to accomplish various functions. The VOIP telephony service 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the VOIP telephony service 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

In the following description, references will be made to an "IP telephony device." This term is used to refer to any type of device which is capable of interacting with a VOIP telephony service to complete a telephone call. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, and as will be discussed below, certain devices that are not traditionally used as telephony devices may act as telephony devices once they are configured with appropriate client software. Thus, some devices that would not normally be considered telephony devices may become telephony devices or IP telephony devices once they are running appropriate software.

As described above, a telephone number is typically only associated with a single customer of a VOIP telephone service, or at least to a single account. More specifically, each telephone number is mapped to a single Uniform Resource Identifier (URI). Thus, there is a one-to-one correspondence between each telephone number and each URI.

When the VOIP telephony service receives a telephone call directed to one of its customers, the VOIP telephony service first generates the URI for that telephone number. The VOIP service then uses the URI to route the call to an IP telephony device.

As illustrated in FIG. 1, multiple telephones 102a, 102b, 102c can all physically be connected to a single telephone adaptor 104. When a telephone call is placed to the telephone number mapped to the telephone adaptor 104, all of the telephones 102a, 102b, 102c connected to the telephone adaptor 104 will ring simultaneously. If each of the telephones 102a, 102b and 102c are used by different parties, such as in a residence or business, the call would ring at multiple telephony devices associated with multiple different users. However, this scenario is limited to situations where multiple telephones are physically wired to, and co-located with, the telephone adaptor 104.

One way to get around these limitations of the point-to-point nature of VOIP telephone systems is to change the mapping scheme from a system where each telephone number is mapped to a single URI, to a system where each telephone number is mapped to a group of users. With this sort of mapping, it is possible to route an incoming telephone call to multiple different telephony devices, even when the telephony devices are not co-located and/or not physically coupled to the same telephone adaptor.

To accomplish this sort of mapping, the VOIP telephony service maintains one or more mapping databases. The mapping databases tie individual telephone numbers to the device IDs of multiple IP telephony devices that are registered with the VOIP telephony system. Each time that an incoming telephone call is received by the VOIP telephony system, the system consults the mapping database to determine if the dialed telephone number is tied to multiple device IDs. If so, in some embodiments, the IP telephony system generates multiple URIs, one for each of the device IDs tied to the telephone number. The multiple URIs would be used to send the call, substantially simultaneously, to all of the IP telephony devices. All of the IP telephony devices would begin to ring, and the system would complete the call to the first IP telephony device to answer.

In actual fact, the calls placed to the IP telephony devices may not be sent absolutely simultaneously, but rather in very rapid succession. And as a result, all of the IP telephony devices would start ringing at approximately the same time. In the following description and claims, the words "simultaneous" and "simultaneously" are intended to cover situations where the described events occur at the same time, or very closely in time. Thus, these words should not be limited to situations that require the events to be absolutely simultaneous.

The mapping databases utilized by the VOIP telephony service might also tie an individual telephone number to both device IDs of IP telephony devices registered with the system, and to one or more telephone numbers associated with telephony devices that are not registered with the system. For example, the telephony devices not registered with the system could be analog telephones or cellular telephones that are only reachable through the PSTN. Alternatively, a telephony device that is not registered with the system could be an IP based telephony device that is registered with some other VOIP telephony system.

In those instances where a single telephone number is tied to both IP telephony devices registered with the system, and telephony devices not registered with the system, the mapping database may include the device IDs for the IP telephony devices registered with the system, and the telephone numbers of the telephony devices not registered with the system. In other instances, the mapping database may include some other reference to the telephony devices registered with the system, such as the URI for the telephony devices.

When an incoming telephone call is received for a telephone number that is mapped to multiple telephony devices, the VOIP telephony system may generate and/or use URIs for the IP telephony devices registered with the system to send the call to those IP telephony devices. The system may also send/forward the call to the telephone numbers of the telephony devices not registered with the system.

With this new mapping scheme, one can terminate telephony communication requests to multiple telephony devices belonging to multiple different users. The telephony devices need not be co-located with or wired to the same telephone adaptor. Thus, the new mapping scheme overcomes the problems noted above for a mapping scheme where each telephone number is mapped to only a single URI.

As will be explained in more detail below, the way in which an incoming call is handled can vary. Also, the users of the system may be able to specify the call handling procedures. Thus, in some embodiments, the telephony system might not simultaneously ring all of the telephony devices corresponding to a particular telephone number. Some alternatives to this procedure are discussed below.

The person who originally established an account connected with a particular telephone number will be referred to as the account owner. The account owner will be able to tie the telephone number for the account to a group of users. This could be done when the account is first established, or at any point in time thereafter.

When an account owner wishes to create a group of users that are to be tied to a particular telephone number, the account owner would need to provide the IP telephony service with information about each of the members of the group. This could include the telephone numbers for the group members, regardless of whether those telephone numbers are registered with the IP telephony service or another separate telephony service. This could also or alternatively include the device IDs for the group members' telephony devices. In some instances, the account owner would be asked for e-mail addresses for the group members. In this instance, the system could then send e-mail messages to the group members that facilitate enrolling the members in the group. Any other form of identifying information could also be provided in an effort to give the IP telephony system the information required for the system to route calls, SMS messages and the like to the telephony devices used by the group members.

If the account owner provides the e-mail addresses of the group members, the IP telephony system could then send an e-mail message to each of the members, and that e-mail message could include instructions about how to join the group. This could include requests to provide identifying information, an alias name, and possibly passwords. This could also include instructions about how to download and install software on the user's telephony devices.

The account owner, and/or the group members themselves may also be able to provide alias names for themselves that will be presented to other members of the group for various purposes. For instance, the group members may be able to utilize a graphical user interface to forward calls to other members, to send calls into the voice mailboxes of other members, or to call other members, and the alias names of the group members could be shown on the graphical user interfaces.

Once a group of users has been established, the account owner and/or the members of the group may be able to alter or update the personal information tied to each of the users. For example, the users may be able to change their alias names, update passwords, or register new telephony devices with the system.

The account owner may also be able to restrict the abilities of the individual group members to perform certain functions. For instance, the account owner may be able to restrict the group members' ability to place certain toll generating telephone calls under the group telephone number, such as long distance or international calls. Likewise, the account owner may be able to restrict the group members' ability to send certain types of SMS messages, as will be explained more fully below.

Each group member may be able to register multiple telephony devices with the system. Thus, a single group member may have multiple telephony devices, each of which receives calls or SMS messages that are being directed to the member. And because of the distributed nature of an IP based telephony system, those telephony devices could be located at virtually any location throughout the world.

When a single telephone number is mapped to a group of users, there need not be any pre-existing relationship between the members of the group. Nor is it necessary for all of the members of a group to belong to the same customer account or billing group. Moreover, as noted above, some of the users of the group need not even have an IP telephony device registered with the VOIP system. Instead, some members might only use a cellular telephone or an analog telephone that only connects through the PSTN, and where the telephone number of such devices is assigned by and controlled through a different telephony service. Further, some members of the group may use electronic devices that are not traditionally considered telephony devices, but which have been configured to act as telephony devices using appropriate software.

For example, assume that a user group is established for all of the immediate members of a family. All of the telephony devices used by the members of the family would be associated with that user group. This could include IP telephony devices used by members of the family, as well as cellular telephones and analog telephones that are carried by or used by the members of the family. The telephony devices might also include devices that can only send and receive text messages and/or e-mail, such as an Apple iTouch. A single telephone number is then associated with the user group in a mapping database. The single telephone number could be the telephone number assigned to the family's home telephony device, or some other number specifically assigned for this purpose.

When a telephone call is placed to the telephone number associated with the family's user group, the telephone call is routed to the IP telephony service. The IP telephony service consults a mapping database to determine if the dialed telephone number corresponds to a user group. In this case, the IP telephony service would determine that the dialed telephone number corresponds to the family user group. Then, as explained above, the IP telephony service uses the information in the mapping database to send the call to the telephony devices of all of the members of the group. As noted above, this could include both IP telephony devices registered with the system, as well as telephony devices that are not registered with the system. The IP telephony system may use the information in the mapping database to create URIs that are used to send the call to IP telephony devices registered with the system. The IP telephony system may also forward the call to the telephone numbers of telephony devices that are not associated with or registered with the system.

In some instances, the IP telephony service would simultaneously ring all of the telephony devices associated with all of the members of a user group. The telephone call would be connected to the first telephony device to answer the call. In some instances, as soon as the call is connected to one telephony device, all other telephony devices would stop ringing.

In other instances, the IP telephony service might not ring all of the telephony devices associated with all of the members of a user group. For example, the IP service might instead only ring the telephony devices for selected members of the group. Or the IP telephony service might only ring a single member of the group.

Call handling preferences that define how an incoming call is handled could be specified by one or more members of the group. Those call handling preferences could be specified by the users via a graphical user interface accessible on a webpage. Alternatively, users could interact with an Interactive Voice Response system to specify call handling preferences. In still other instances, the users could speak with a customer service representative to specify call handling preferences. Any method for specifying call handling preferences could be used, so long as the users are able to define how incoming and/or outgoing calls are to be handled. The call handling preferences are then stored in one or more databases maintained by the IP telephony service.

In some embodiments, all of the members of a group may be empowered to set and change the call handing preferences for the group. In other instances, only some members, or only one member, of the group may be empowered to set and change call handing preferences. Also, one master member of the group may be able to assign and/or revoke the ability to set and change call handling preferences to other members of the group.

The call handing preferences could include instructions about which of the telephony devices for which of the members should be rung when an incoming call directed to the group's telephone number is received. The call handing preferences could also include instructions about other aspects of call handling.

For example, the call handing preferences could specify that if no member of the group answers a call, the caller is to be directed to a particular voice mailbox for one member of the group. Alternatively, the caller could be directed into a voice mailbox that is accessible to all members of the group. In still other instances, the call handing preferences might specify that the caller leave a voice message that is delivered into the voice mailboxes of multiple members of the group.

In still other embodiments, if no member of the group answers the incoming call, the call handing preferences might indicate that the call should be forwarded to a different specific telephone number, or that the call should be connected to a specific IP telephony device. Alternatively, the call handling preferences might indicate that if no member of a first group answers the call, the call is to be redirected to another group entirely. In this instance, the call handling preferences for that alternate group would determine how the call is handled.

The call handing preferences might specify that when an incoming call directed to a telephone number for a group is received, and the telephony devices for multiple members of the group are rung, that the call be connected to the first telephony device that answers. In alternate embodiments, the call handling instructions might instead indicate that the call should be connected to all telephony devices that answer the call. Or that all telephony devices should be rung for a predetermined period of time, even if one of the telephony devices answers the call before the predetermined period of time expires. In this instance, all telephony devices that answer within the predetermined period of time could be connected to the calling party in a conference call arrangement.

When a multi-member group is mapped to a single telephone number, it is possible that one member of the group may answer an incoming telephone call that was meant for another member of the group. To help deal with this situation, the IP telephony system provides users with a method to easily forward the call to another member of the group.

In some embodiments, when a user answers an incoming telephone call meant for another member of a group, the user could press a button or issue a command that calls up a list of the other members of the group. The user could then select one of the listed members, and the call would be forwarded to that member.

The list of other group members could be presented to the user via a graphical user interface. In this instance, the user could make use of a pointing device, press a numbered key, or utilize some other selection means to choose the member to which the call is to be forwarded.

In other instances, an audio prompt could be played to the user, where each of the other group members correspond to a particular number or letter. The user would then make a selection by pressing a key corresponding to the group member to which the call is to be forwarded.

In still other instances, the user might be able to simply issue a speech command that is interpreted by the IP telephony system. For example, the user could speak the command "transfer call to John," and this spoken command would be interpreted by the system, and the system would thereafter transfer the call to John.

The list of group members presented to a user in these circumstances might also provide some indication about whether the other group members are available to receive a call. A group member might be unavailable because they are already on another call and their telephony device is in use, or because their telephony device is temporarily disconnected or turned off.

For instance, if the other group members are listed on a graphical user interface presented to the user, members who are available to receive a call could be indicated in some fashion, and/or members who are unavailable to receive a call could be indicated in some fashion. The user might be able to see this information while the user is still talking to the caller. Thus, the user may be able to inform the caller that the desired group member is unavailable.

In addition to allowing a user to forward a call to another group member, the IP telephony system may also allow the user to send a caller into a voice mailbox. The voice mailbox to which the caller is directed could be one for the user who actually answered the call, or the voice mailbox for another group member. The methods by which the user would direct the caller into a voice mailbox could be the same or similar to the methods of forwarding calls discussed above.

If a user is presented with a graphical user interface which indicates which of the other group members are available for a call, the user would be able to decide whether to forward a caller on to another group member, or whether to send the caller into a voice mailbox for that other group member. And because the user would initially be connected to the caller, the user could inform the caller about how the call is going to be handled. Also, this would allow the caller to request that he be connected to a first group member, and if that person is unavailable for a call, the caller could then ask to be connected to an alternate group member.

The users may be able to control their individual telephony devices such that the telephony devices inform the IP telephony system about whether they are willing to receive incoming calls and messages. This would likely be handled by a graphical user interface on the device itself. Thus, a user could set one or all of his telephony devices such that it will not receive incoming calls.

In some embodiments, the ability to control whether a telephony device will receive incoming calls is performed on a device-by-device basis. Thus, a user could set one of his telephony devices to receive incoming calls, while another device is set to reject or not receive incoming calls. In other embodiments, this could be done on a user-by-user basis, such that the user could instruct the system not to ring any of his telephony devices when an incoming call is received. Some embodiments will be capable of supporting both of these options alternatively or simultaneously.

A user may also be able to control his telephony devices to either decline an incoming call, or to simply silence the ringing on one of multiple telephony devices associated with the user. For instance, if the user opts to decline an incoming call, the system would stop ringing all of the telephony devices associated with that user. On the other hand, if the user opts to silence the ringing on one of his telephony devices, the user's other telephony devices may continue to ring. Further, declining an incoming call might cause the caller to immediately be routed into the user's voice mailbox, whereas silencing the ringing on one device would not.

In some instances, as described more fully below, a user's telephony device could be associated with both the telephone number of a group, and with a telephone number assigned to the individual user himself. In this instance, when an incoming call is received, the user's telephony device may provide different ringtones depending on which telephone number was called.

The call handing preferences for a group could also be dependant on the time of day and/or the day of the week. For example, assume that a group is established for a business, and that a single telephone number for the business is mapped to multiple telephony devices used by the employees of the business. The mapping database could list IP telephones that are located on the employee's desks, as well as cellular telephones carried by the employees. In this scenario, the call handling instructions could indicate that between the hours of 9 am and 5 pm, incoming calls directed to the business telephone number should be routed to both the IP telephones on the employee's desks, as well as to the employees' cellular telephones. However, the call handling preferences could also indicate that after 5 pm, incoming calls should only be routed to the IP telephones on the employees' desks. The call handling preferences might further indicate that after 7 pm, all incoming calls should be routed to a central voicemail system for the business. Thus, the call handling instructions would be dependent on the time of day.

In another example, assume that a single telephone number for a business is mapped to three employee telephones. A first employee telephone is located in New York, a second employee telephone is located in Chicago, and a third employee telephone is located in Los Angeles. The call handling preferences for this group of users could specify that calls to the business telephone number are to be sent to the first employee telephone only between 9 am and 5 pm EST. The call handling preferences could also indicate that calls to the business telephone number are to be sent to the second employee telephone only between 9 am to 5 pm CST. Likewise, the call handling preferences could indicate that calls to the business telephone number are to be sent to the third employee telephone only between 9 am to 5 pm PST. These call handling preferences are also time of day dependent, but the times vary depending on the location of the telephones. Thus, the time of day dependence of the call handling preferences varies for each individual telephony device.

Of course, many other ways of handling an incoming call could also be specified, as would be apparent to one of ordinary skill in the art.

In the embodiments discussed above, it was assumed that a group of users is tied to a particular telephone number through a mapping database. In alternate embodiments, mapping databases could tie a group of users to a group identifier other than a telephone number. Thus, a group of users could be associated to any sort of identifier, label or identification tool.

Figure 3:
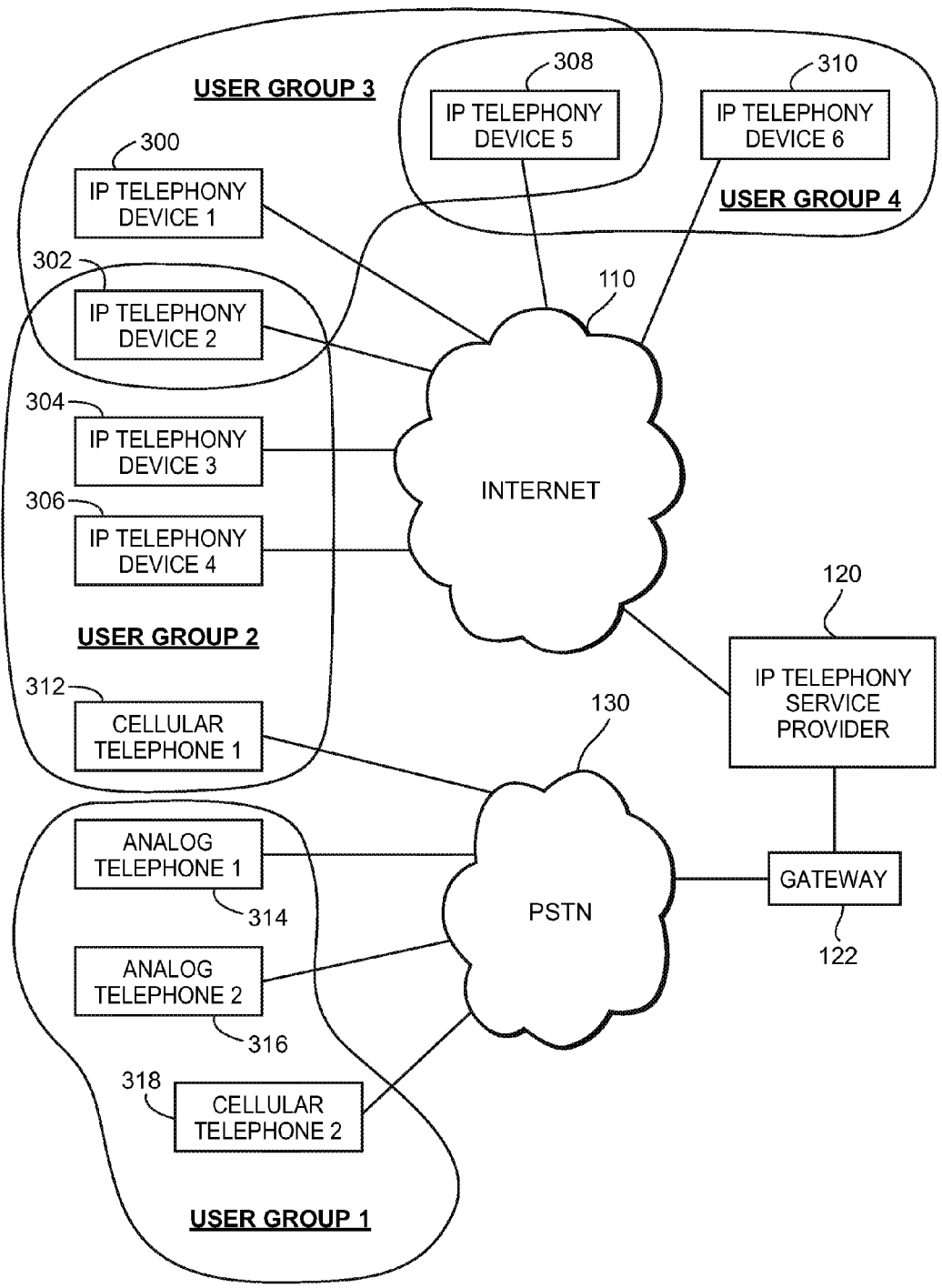
FIG. 3 is a diagram illustrating how various IP telephony devices and analog and cellular telephones can be associated with user groups.

FIG. 3 illustrates how various different telephony devices can be associated with individual user groups. As shown in FIG. 3, user group 1 includes analog telephone 1 (314), analog telephone 2 (316) and cellular telephone 2 (318). User group 2 includes IP telephony device 2 (302), IP telephony device 3 (304), IP telephony device 4 (306) and cellular telephone 1 (312). User group 3 includes IP telephony device 1 (300), IP telephony device 2 (302), and IP telephony device 5 (308). User group 4 includes IP telephony device 5 (308) and IP telephony 6 (310).

As illustrated in FIG. 3, an individual telephony device can be associated with more than one user group. For example, IP telephony device 2 (302) is a member of both user group 2 and user group 3. Likewise, IP telephony device 5 (308) is associated with both user group 3 and user group 4.

As explained above, each of the individual user groups would be associated with at least one telephone number or group identifier. In some instances, a user group could be associated with more than one telephone number and/or group identifier.

As noted above, call handling instructions could specify how incoming calls are to be handled for the individual groups. For example, and with reference to FIG. 3, user group 3 could include all of the IP telephony devices associated with a single person. IP telephony device 2 (302) could be located at the user's office, IP telephony device 5 (308) could be located at the user's home, and IP telephony device 1 (300) could be a soft phone client which is running on the user's personal computer. When all of the IP telephony devices are registered as being part of user group 3, all of the devices can be simultaneously rung when a telephone call is placed to a telephone number associated with user group 3. However, the user could also specify that only certain IP telephony devices associated with user group 3 should be rung during certain times of the day. For example, the user could specify that IP telephony device 2 (302), which is located at the user's office, only be rung between the hours of 8:00 a.m. and 6:00 p.m. The user could also specify that IP telephony device 5 (308) should only be rung between the hours of 5:00 p.m. and 8:00 a.m. As a result, when a telephone call is placed to a telephone number associated with user group 3, IP telephony device 2 (302) would not ring after business hours. Likewise, IP telephony device 5 (308) would not ring during business hours. However, IP telephony device 1 (300), which is the soft-phone client running on the user's computer, would ring at all times of the day.

It is also possible for multiple telephone numbers and/or group identifiers to be associated with a single user group. In instances where two or more numbers are associated with a user group, the call handling instructions could differ depending on which of those numbers was called. For example, if first and second telephone numbers are associated with a user group, the members of a user group could specify that a first subset of all of the telephony devices associated with the members of the user group should be rung when a call is placed to the first telephone number, but that a second subset of the telephony devices should be rung when a call is placed to the second telephone number.

As also illustrated in FIG. 3, as long as a user is registered with a IP telephony service, telephony devices which are not IP telephony devices could form all or portions of a user group. User group 2 includes cellular telephone 1 (312) which can only receive calls via the PSTN 130. However, if the IP telephony service 120 receives a telephone call for a telephone number associated with user group 2, depending on the call handling instructions, the IP telephony service will cause cellular telephone 1 (312) to ring along with IP telephony device 2 (302), IP telephony device 3 (304) and IP telephony device 4 (306). The IP telephony service would route a call to cellular telephone 1 (312) through the gateway 122 and the PSTN 130.

Likewise, user group 1 includes analog telephone 1 (314), analog telephone 2 (316) and cellular telephone 2 (318), all of which only connect through the PSTN 130. However, if a telephone number associated with user group 1 is received at the IP telephony service, the call can be connected to those devices through the gateway 122 and the PSTN 130.

Figure 4:
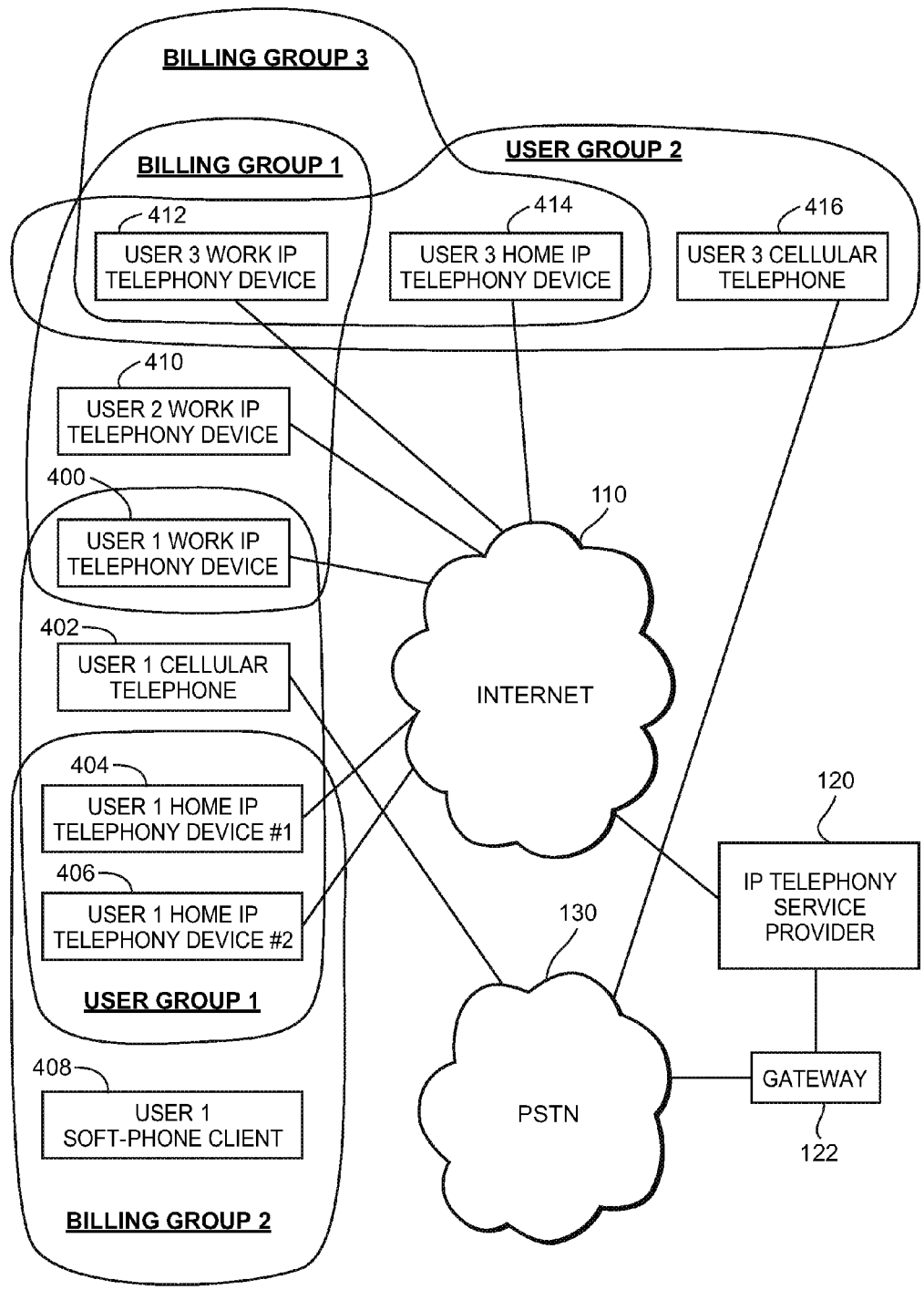
FIG. 4 is a diagram illustrating how various IP telephony devices and analog and cellular telephones can be associated with different user groups and different billing groups.

FIG. 4 illustrates that individual telephony devices can also be associated with more than one billing group or customer account. As shown in FIG. 4, user 1's work IP telephony device 400, user 2's work IP telephony device 410 and user 3's work IP telephony device 412 are all associated with billing group 1. This would typically mean that all of the calls made via the work IP telephony devices are paid for by a business. However, user 1's work IP telephony device 400 could also be a part of user group 1. User group 1 also includes user 1's cellular telephone 402, user 1's home IP telephony device 1 (404) and user 1's home IP telephony device 2 (406).

User 1 could specify that user 1's home telephone number be associated with user group 1. As a result, whenever a telephone call is placed to user 1's home telephone number, all the telephony devices in user group 1 would be rung. However, when user 1 utilizes his work IP telephony device 400 to place a chargeable telephone call, the cost of the call would be billed to billing group one. This allows user 1's work IP telephony device to receive calls placed to both a work telephone number and user 1's home telephone number, but this arrangement also results in chargeable calls placed by user 1's work IP telephony device 400 only being billed to the business.

FIG. 4 also illustrates that user 1's home IP telephony devices (404) and (406) and user 1's soft-phone client 408 could be a part of billing group 2. Whenever the user utilizes one of those telephone devices to place a chargeable call, the call would be charged to the user's home or personal IP telephony account. Because user 1's cellular telephone 402 is not associated with billing group two, any calls placed through user 1's cellular telephone 402 would be billed to a separate account associated with that cellular telephone.

In a similar manner, user group 2 includes user 3's work IP telephony device 412, user 3's home IP telephony device 414 and user 3's cellular telephone 416. In this instance, user group 2 would be associated only with user 3's home telephone number. As a result, whenever a telephone call is placed to user 3's home telephone number, all of user 3's telephony devices would be rung.

In other instances, user group 2 could be associated both with user 3's home telephone number and user 3's work telephone number. Whenever a telephone call is placed to either of those telephone numbers, all three of user 3's telephony devices would be rung.

Moreover, a single telephony device might be associated with more than one customer or billing account. FIG. 4 illustrates that user 3's work IP telephone device 412 is associated with both billing group 1 and billing group 3. Billing group 1 would be a business account which covers calls made by user 1, user 2 and user 3's work IP telephony devices. However, user 3's work IP telephony device is also associated with billing group 3. And user 3's home IP telephony device 414 is also a member of billing group 3. Thus, billing group 3 would be user 3's home or personal account.

When a particular telephony device is associated with multiple billing accounts, it will be necessary for the user to specify which account is to be charged whenever a call is placed. Or, alternatively, there may be a default assumption about which account should be charged, and this will only be altered if the user takes steps to cause a different account to be charged. Aspects of these concepts are discussed in more detail below.

Figure 5:
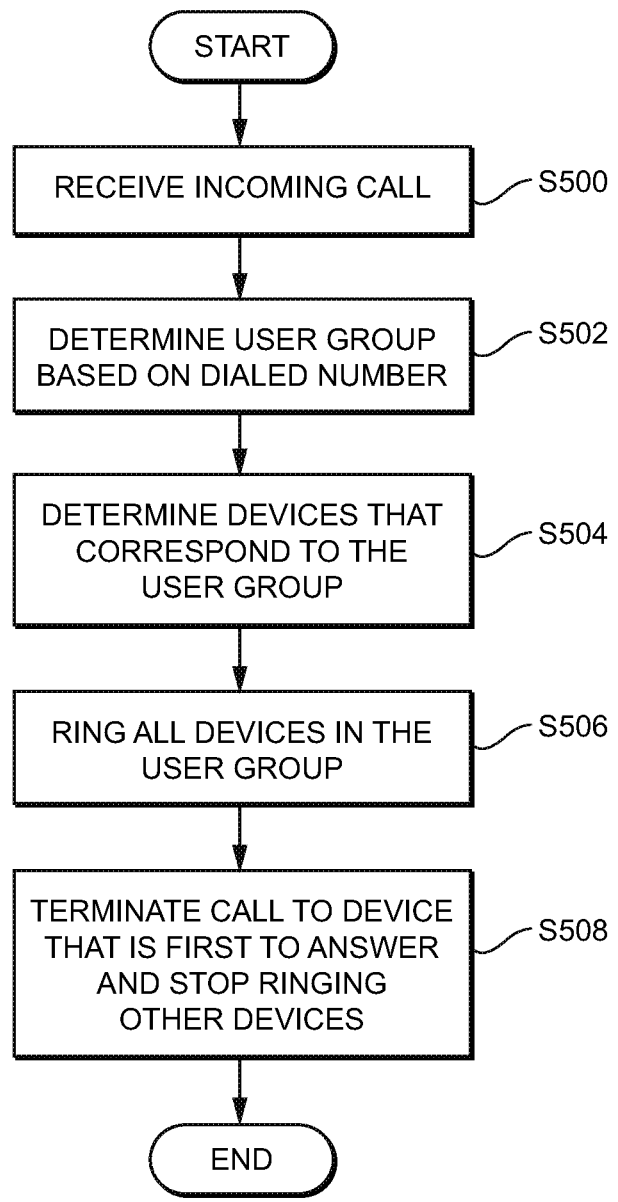
FIG. 5 is a diagram illustrating steps of a method of connecting a telephone call.

FIG. 5 illustrates the steps of a method of handling an incoming call. As illustrated in FIG. 5, the method begins in step S500 where an incoming telephone call is received by a IP telephony service. In step S502, the IP telephony service determines the user group which is associated with the dialed telephone number. In step S504, the IP telephony service then determines which telephony devices correspond to that particular user group.

In step S506, the IP telephony service rings all of the telephony devices associated with the user group. In step S508, the call is ultimately connected to the telephony device which is first to answer the call. As soon as the call is routed to one of the telephony devices, the ringing of the other telephony devices is halted.

As noted above, call handling instructions for a particular user group could be registered with the IP telephony service. The call handling instructions could instruct the system to ring only a subset of all of the telephony devices associated with a particular user group during certain times of the day or certain days of the week. The call handling instructions might also indicate that only a subset of all of the telephony devices should be rung depending on which number was called. Further, the call handling instructions could indicate that only a subset of all of the numbers should be called depending on the identity or telephone number of the calling party. In those instances, in step S508 of the method illustrated in FIG. 5, only a subset of the telephony devices would be rung in accordance with those call handling instructions.

Typically if a telephone call is not answered, the call would be routed to a voice mailbox. When a call is being handled as described above, it is desirable to route the telephone call to a voice mailbox if the call is not answered. The call handling instructions for a particular user group could specify that unanswered calls be routed to a particular voice mailbox. Those call handling instructions could also indicate that one voice mailbox should be used during certain times of the day or days of the week, and that a different voice mailbox should be used during other times of the day or days of the week. The voice mailbox to which an unanswered call is sent might also depend on the number that was called, or on the identity or telephone number of the calling party.

A user group might establish a voice mailbox which is to be commonly used by all members of the group. In that instance, when a message is left in the voice mailbox, all of the users may be able to retrieve and listen to the message. However, the users might also specify that only certain members of the group are able to access and play messages left in the voice mailbox.

If multiple members of the group are able to access and play messages left in a common voice mailbox, it is desirable to provide methods of indicating to the users whether there is a new message which they have not yet heard. For example, assume that two messages have been left in a common voice mailbox for a particular user group. Assume also that a first one of the members of the group has retrieved and played those two messages. If a second member of the group then accesses the mailbox, the system would indicate to the second user that he has not yet heard the two messages. Likewise, if the first user again accesses the voice mailbox, the system would indicate to the first user that no new (unheard) messages have been left in the voice mailbox. Accordingly, a IP telephony service which is configured with user groups as described above may also include functionality for handling messages left in a voice mailbox.

The procedures for handling voice messages could also include permissions to play and delete messages left in a voice mailbox. Alternatively, once a message has been left in a common voicemail for a user group, the message might be maintained until all of the users in that group have instructed the system to delete the voice message.

In some embodiments, the system may transcribe voicemail messages and send the transcription to members of the group. Here again, the call handling instructions for the group could determine who receives a transcribed version of a voicemail message.

Another aspect of grouping users together in the mapping database relates to the originating telephone number that is communicated to other parties when a telephone number is dialed by a user. In known systems, each individual telephony device is assigned its own telephone number. When a user outdials a call, the telephone number of the user's telephony device may be communicated to other parties. For example, the telephone number of the user's telephony device can be included as caller ID information that is communicated to the telephony device of the called party. The telephone number of the user's telephony device would then be displayed to the called party while the called party's telephony device is ringing.

With a system as described above, a single telephony device can be associated with multiple different telephone numbers. As a result, it is possible for a call initiated by a single telephony device to originate from multiple different telephone numbers.

The IP system would also allow a user to specify preferences about how outgoing calls are to appear to the called party. Those preferences could indicate, for a particular telephony device, that a default telephone number is to be used as the originating telephone number for all outgoing calls placed with the telephony device. However, on a call-by-call basis, the user may be able to select one of the other telephone numbers associated with the telephony device to be used as the originating telephone number. In other embodiments, each time that a user places a call with a telephony device associated with multiple telephone numbers, the user will select the telephone number to be used as the originating number.

For example, and with reference to FIG. 4, user 3's work IP telephony device 412 is associated with billing group 1 and also with user group 2. This means that user 3's work IP telephony device 412 could receive calls placed to user 3's home telephone number, and calls placed to a cellular telephone number associated with user 3's cellular telephone 416, as well as calls placed to user 3's work telephone number.

When user 3 wishes to place an outgoing call, user 3 could be provided with the ability to select one of those three telephone numbers to be the originating telephone number. For example when user 3 utilizes his work IP telephony device 412 to place a telephone call, the user could specify that the originating telephone number should be user 3's office telephone number. In that instance, the call would be charged to billing group 1, and paid for by the business. Alternatively, the user could specify that the originating telephone number be user 3's home telephone number. In that instance, the call would be charged to the user's home or personal account, under billing group 3, not to billing group 1. Thus, the user can individually select which originating telephone number should be used when a call is placed, and thus the billing group that should be charged for that telephone call. In other words, the selection of an originating telephone number might work to also select the billing group that is to be charged for a placing a call. In other instances, the selection of the originating telephone number could be independent of the selection of the billing group to be charged.

In some instances, there may be a default decision about which originating telephone number and/or which billing group should be used. In this instance, the user would have to take a positive action to select a different originating telephone number or a different billing account. For example, whenever user 3 places a call with user 3's work IP telephony device 412, the system would assume that the user wishes the call to originate from user 3's work telephone number and be billed to billing account 1. But when user 3 places a telephone call with user 3's home IP telephony device, the system would assume that the call should originate from user 3's home telephone number and be billed to billing account 3. However, the user may be able to select an alternate originating number and/or an alternate billing account by providing an instruction to the system when the call is placed.

The selection of a particular telephone number to be used as the originating telephone number could be made by the user via a graphical user interface. For instance, each time that a user dials a call, the user may be presented with a menu asking the user to select the originating number to be used. Alternatively, if a default number is to be used, it may be necessary for the user to take affirmative action to call up a graphical user interface that allows the user to select the originating telephone number to be used.

In still other embodiments, the system might play an audio prompt to the user asking which of multiple originating telephone numbers should be used. In this instance, the user could press a key or button, or use a pointing device to select the originating number to be used. Alternatively, the user may be able to speak a response that is interpreted by the system.

In still other embodiments, the user may be able to interact with the system using speech-based commands to select the originating telephone number that is to be used. A speech-based command could be initiated by the user before, during or after the dialing instructions have been provided. And it might only be necessary to issue such a speech-based command if the user wishes to deviate from the use of a default originating telephone number.

Likewise, in instances where it is possible for a user to make a selection about which account is to be billed for placing a call, the user could select the billing account in the same way or in similar ways to those discussed above in connection with selecting the originating telephone number.

As also explained above, multiple different telephony devices can be assigned to a user group associated with a single telephone number. For example, assume that three telephony devices are assigned to a user group for a business, and all three telephony devices are associated with the business telephone number. Assume also that the first telephony device is located in New York, the second telephony device is located in Chicago and the third telephony device is located in Los Angeles. When the users of the three telephony devices place calls to other parties, all three telephony devices can use the same originating telephone number, which is the one assigned to the business. Thus, regardless of which telephony device is used, all calls will appear to originate from the same number. This functionality was not possible with prior known systems.

Figure 6:
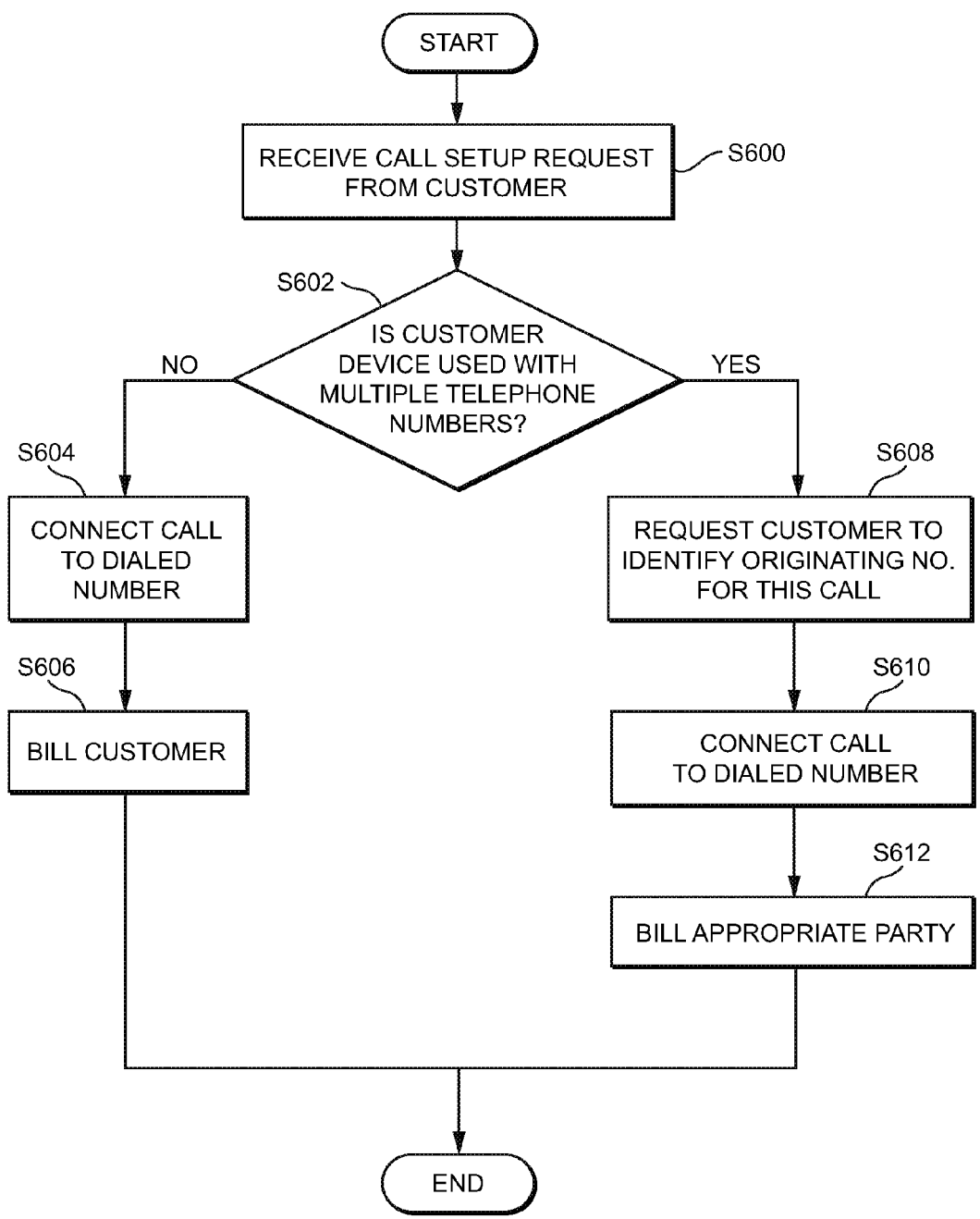
FIG. 6 is a diagram of steps of another method of connecting a telephone call.

FIG. 6 illustrates a method of placing a telephone call using a system as described above. The method begins in step S600 where the customer has placed an outgoing telephone call and the IP telephony service receives the call setup request from the customer. In step S602, the IP telephony service checks to determine if the telephony device which is placing a call is associated with multiple different telephone numbers. If not, the method proceeds to step S604 and the call is connected to the dialed number. The customer's single telephone number would then be charged for the cost of placing that call in step S606.

If the telephony device used to place the telephone call is associated with multiple telephone numbers and/or billing accounts, then the IP telephony service requests the customer to identify the originating telephone number which is to be used for this call. In step S610, the IP telephony service then connects the call to the dialed telephone number using the originating telephone number specified in step S608. In step S612, the party associated with the originating telephone number would then be charged for that call.

In some instances, when the IP telephony service realizes that the telephony device used to place a call is associated with multiple telephone numbers, the service provider could request that the user identify the originating telephone number to be used for the call. In other instances, the information about which originating telephone number to use could be included as part of the call setup request which is originally received from the user in step S600. In still other instances, as noted above, the IP telephony system could make an assumption about which telephone number to use as the originating telephone number and/or billing account, and the IP telephony service would use a different telephone number and/or billing account only if so instructed by the user.

In the user groups described above, a single telephony device can be associated with multiple different user groups. Each of those user groups could be associated with different telephone numbers. Likewise, a single user group could be associated with multiple different telephone numbers. As a result, when a call is being received at a particular telephony device, that call could have been placed to any one of multiple different telephone numbers.

Because a telephony device can be associated with multiple different telephone numbers, it would be desirable for the telephony device to display the telephone number that was dialed by the calling party. If this is done, the user will be able to determine which telephone number was dialed before he decides to answer the call. Many telephony devices already provide for a display of the telephone number of the party who placed the telephone call. However, such devices might also be modified to also display the telephone number which was dialed by the caller. As a result, the user would see both the telephone number of the calling party, and the telephone number that was dialed by the calling party.

Another way in which groups can be utilized is to allow members of a group to easily place a call to another member of the group. In some embodiments, a user could utilize his telephony device to call up a graphical user interface that lists all the other members of the group. The user could then select one of the other members presented on the graphical user interface to immediately place a telephone call to that member. In this example, it would not be necessary for the user to dial a telephone number associated with the other member of the group. In a similar fashion, a user could interact with a system of audio prompts to place a call to another member of the group, or a user could issue a speech command to place a call to another member of a group.

As explained above, the devices which can used by members of a group to send and receive telephone calls need not be regular telephones. Instead the devices could simply be computing devices that are running software. In some situations, some or all of the devices used by the members of the group could be associated only with the single telephone number tied to the group. In other words, the devices may not be associated with some other independent telephone number. Under those circumstances, the ability described above would allow one member of the group to place a call to the other member of the group without dialing a telephone number, and without even dialing the telephone number associated with the group.

In a similar fashion, some embodiments of the system would allow a user to place a telephone call directed to the telephony device of a member of some other group. Here again, the user would make use of a graphical user interface and/or speech commands as discussed above. In these embodiments, the user would first need to capture or obtain some sort of identifier for the member of the other group that the user wishes to call. Or the user could be able to utilize an identifier that is recognizable to the IP telephony system, such as an e-mail address for the person the user wishes to reach. The users would then specify that identifier to the IP telephony system, and the IP telephony system would establish a call between the user's telephony device and the telephony device of some member of a completely different group.

A system as described above can also be used to deliver SMS text messages to telephony devices associated with a user group. Typically, an SMS message would be directed to an individual telephone number. When that telephone number is associated with a particular user group, the SMS message would then be sent to all or selected members of the group based upon message handling instructions, similar to the way that incoming calls are directed based on call handling instructions, as discussed above.

In the following discussion, references are made to SMS messages. This term is intended to encompass not only traditional SMS messages, but also multimedia messaging service (MMS) messages. As is known to those skilled in the art, it is also possible to attach certain types of files to MMS messages. MMS messages are processed in a highly similar fashion as SMS messages, although additional files are generally attached to and delivered with MMS messages. The system and handling procedures described herein would apply equally to MMS messages. Thus, any reference to SMS messages is intended to also encompass MMS messages.

Moreover, it is anticipated that different forms of messaging and message traffic may be developed in the future. For instance, audio messaging may become more common in the future. The concepts disclosed and claimed herein will also be applicable to later developed forms of messaging and message traffic. Thus, the term "SMS message" used herein is intended to cover any form of messaging traffic now in existence or later developed.

Figure 7:
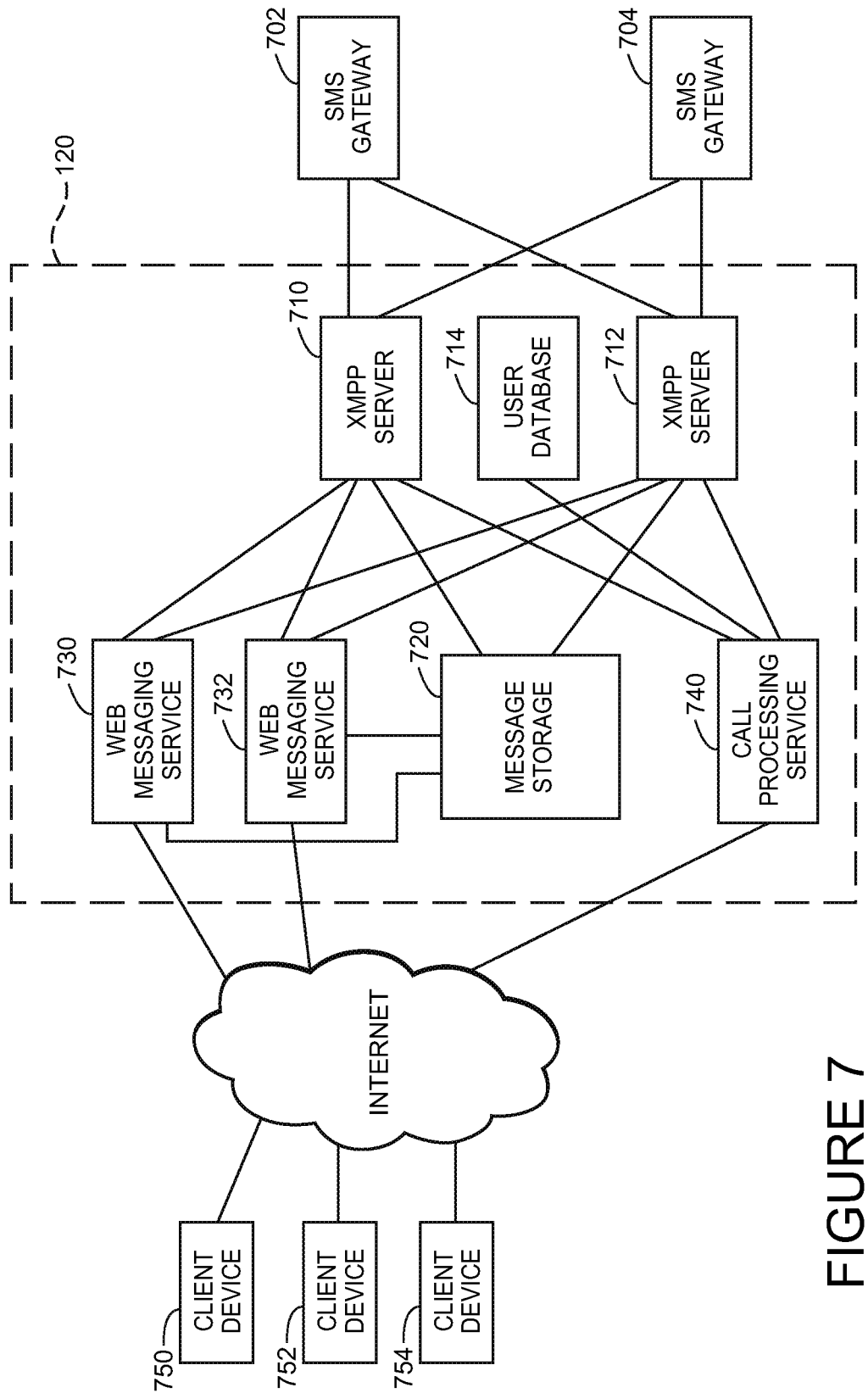
FIG. 7 is a diagram of elements of a system for delivering SMS messages to telephony devices.

FIG. 7 illustrates various elements of a system that could be used to deliver SMS messages to client telephony devices registered with an IP telephony service. The dashed line surrounds those elements that, in some embodiments, would be owned and/or controlled by the IP telephony service 120. However, in alternate embodiments some of the elements shown within the dashed line might not be owned and/or controlled by the IP telephony service 120. Likewise, in some embodiments, other elements not shown within the dashed lines might also be owned and/or controlled by the IP telephony service 120.

The system would rely upon one or more SMS gateways 702, 704 to deliver SMS messages from telephony devices that are registered with other telephony systems. Likewise SMS messages that are generated by telephony devices registered with the IP telephony service 120 would be sent to the SMS gateways 702, 704 for delivery to telephony devices registered with other systems.

In some instances, the SMS gateways 702, 704 would be owned and/or controlled by the IP telephony service 120, and in other instances, the SMS gateways 702, 704 may be owned and/or controlled by third parties. The SMS gateways 702, 704 would have connections to other telephony service providers so that they can receive SMS messages from users of the other service providers, and so that they can deliver outgoing SMS messages to other service providers.

One or more internal messaging gateways would handle the distribution of incoming SMS messages. The internal messaging gateways would also route SMS messages generated by users if the IP telephony service to other users of the service, or to telephony devices registered with another separate telephony service. In the embodiment illustrated in FIG. 7, the messaging gateways are the XMPP servers 710, 712, which are connected to the SMS gateways 702, 704. Preferably, an IP telephony service would maintain multiple XMPP servers for redundancy, although a single XMPP server could be used. Each XMPP server would be capable of handling XMPP message traffic, although the XMPP servers might also perform other functions.

The XMPP servers would receive incoming SMS messages from the SMS gateways 702, 704 that are being sent from telephony devices registered with other telephony service providers and that are addressed to telephone numbers handled by the IP telephony service. The XMPP servers 710, 712 would also deliver outbound SMS messages to the SMS gateways 702, 704.

In order for the SMS gateways 702, 704 to know which SMS messages to deliver to the XMPP servers 710, 712, the IP telephony service 120 would need to provide the SMS gateways 702, 704 with lists of the telephone numbers that are assigned to the IP telephony service users. This information may be stored in the user database 714. This could be done periodically through one or more of the XMPP servers, or via another means.

The XMPP servers 710, 712 would process each inbound SMS message. The processing would include copying or storing the SMS message in a message storage device 720. The message storage device would retain a copy of each incoming SMS message for a predetermined period of time.

However, once that time expires, the SMS message may be deleted. In some embodiments, if a SMS message has not been accessed by the party to which it was sent, it would not be deleted, even if the normal retention time has expired.

The XMPP servers would also examine the telephone number to which the SMS message is directed. The XMPP server would then cause a message to be sent to the client device or devices associated with that telephone number to inform the user that there is an incoming SMS message for the user stored in the message storage system 720. This could occur by having the XMPP server send a notice to a call processing service 740 that tracks the availability of all client devices, and the IP addresses at which the devices can be reached. In this instance, the XMPP server would send a notification to the call processing service 740 indicating that a new SMS message for a particular user has been received and copied into the message storage system. The call processing service 740 would then send a message or notification out to the appropriate client device 750, 752, 754 via the Internet.

As explained above, a single telephone number could be associated with a group of users and/or a group of user devices. That information could be stored in a mapping or user database 714. Thus, when an incoming SMS message is received at an XMPP server 710, the XMPP server 710 could consult the user database 714 based on the telephone number to which the SMS message is directed. If the XMPP server 710 determines that the telephone number is connected with a group of users, the XMPP server may forward the list of users who are to receive the SMS message to the call processing service 740 so that the call processing service can send an alert message to all of the client devices 750, 752, 754 that are associated with members of the group.

As explained above, when an incoming telephone call is directed to a telephone number tied to a group of members, the group may have specified call handling instructions that indicate how the incoming call is to be handled. Likewise, a group of members can also specify how incoming SMS messages are to be handled. These message handling instructions can also be stored in the user database 714, or at some other location. When such message handling instructions exist, the IP telephony service would follow the instructions to ensure that an incoming SMS message is delivered to the appropriate parties.

In some embodiments, an XMPP server might access SMS message handing instructions for a group at the same time the XMPP server consults the user database 714 to determine if the telephone number to which an SMS message is directed is mapped to a group of users. In this instance, the information sent from the XMPP server 710 to the call processing service 740 could specify the users that are to receive the incoming SMS message.

In other instances, an XMPP server might simply pass the notification of the incoming SMS message on to the call processing service 740, and the call processing service might access the user database 714 to determine who should receive the SMS message. As noted above, this could include determining all of the users that are mapped to the telephone number to which the SMS message is directed. This could also include accessing SMS message handing instructions that specify who should receive the SMS message.

Similar to the explanation provided above in connection with incoming calls, the SMS message handling instructions could be time of day or day of the week dependent. The SMS handling instructions could also be dependent on the identity of the party that sent the SMS message. All of the factors discussed above in connection with incoming call handling instructions could apply also to incoming SMS message handling instructions.

In the explanation provided above, a call processing service 740 is used to route a notification about an incoming SMS message to the appropriate client devices. However, in alternate embodiments the notification about an incoming SMS message could be delivered to client devices in other ways. For example, such notifications could come directly from the XMPP servers, or such notifications could be sent through a separate service that is not connected with processing incoming telephone calls.

Once a client device receives a notification that an incoming SMS message has been received, the client device would request a copy of the SMS message via a messaging web service 730, 732. The client devices 750, 752, 754 would send such messages via the Internet. The messaging web service 730, 732 would then obtain the SMS message from the message storage device 720 and forward it on to the client device.

In alternate embodiments, the client devices might obtain the SMS message directly from the message storage device 720, or the client devices might obtain the SMS message in some other fashion.

As noted above, one member or multiple members of a group mapped to a telephone number may be capable of specifying how incoming SMS or MMS messages are to be handled. This can include who is to receive copies of such incoming messages. And as also discussed above, those message handling instructions could vary based on any number of factors. The ability to specify such message handling instructions might be entrusted to only one member of the group, or such message handling instructions could be specified by multiple or all members of the group. Similarly, the owner of a group account might be able to assign the ability to specify message handling instructions.

Figure 8:
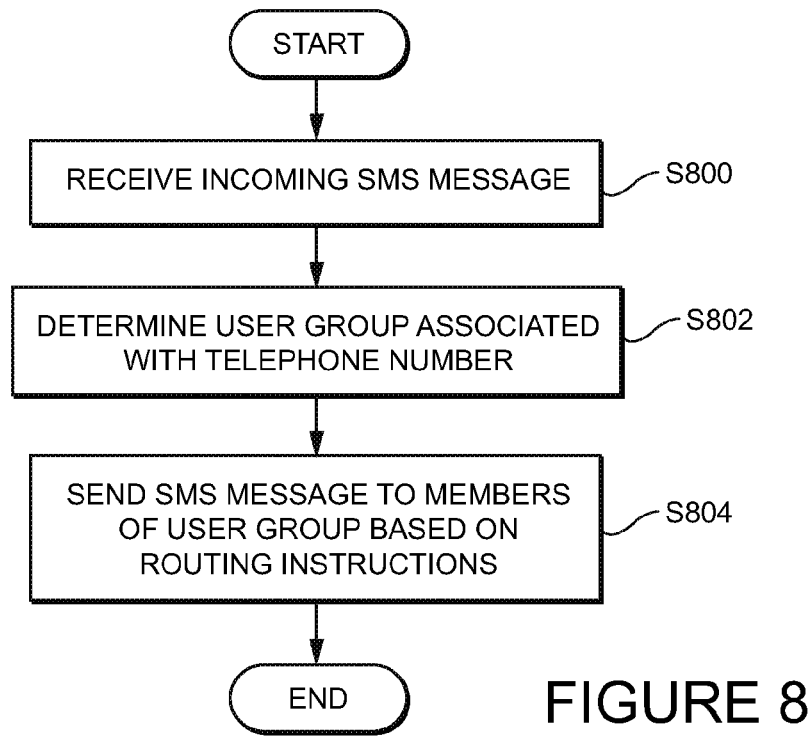
FIG. 8 is a diagram of steps of a method of delivering SMS text messages.

FIG. 8 illustrates a generalized method of delivering SMS messages to members of a user group. The method starts in step S800 where an incoming SMS message is received by the IP telephony service. In step S802, the IP telephony service determines whether there is a user group associated with the telephone number to which the SMS message is directed. If so, in step S804, the IP telephony service delivers the SMS message to the telephony devices of all of the members of the group, or to selected members of the group, based on message handling instructions which have been specified for that group.

The call handling instructions for a particular group could indicate that all incoming telephone calls are to be directed to only a single telephony device, while the message handling instructions for that group could indicate that any incoming SMS messages should be routed to all members of the group, or to only a subset of the group. When a user group is organized in this fashion, all incoming telephone calls are directed to a single telephony device, whereas all incoming SMS messages are directed to multiple members of the group. Thus, the way in which telephone calls are handled for a particular group could differ from the way in which SMS messages are handled for that group.

The SMS message handling instructions could also specify the way in which outgoing SMS messages and reply messages are to be handled. For instance, the SMS handling instructions could indicate that whenever a member of a group sends an outgoing SMS message, or a reply to a received SMS message, a copy of that message is sent to all members of the group. Alternatively, if the SMS message handling instructions indicate that only some members of the group should receive an incoming SMS message, if one of the members replies to the message, the reply might only be sent to those group members that originally received a copy of the incoming SMS message. In still other instances, the SMS message handling instructions might specify that copies of reply messages should never be sent to other members of the group. The SMS message handling instructions related to reply messages could be configured in any fashion that is sensible or advantageous to the members of the group.

The SMS message handling instructions could differ for reply messages and simply new outgoing messages. For instance, the SMS message handling instructions might indicate that a copy of a reply message is sent to only those members that received the original incoming SMS message. The handling instructions might also indicate that all members of the group should receive a copy of all completely new outgoing messages, or that no members should be copied on any outgoing messages.

The handling instructions for reply and outgoing messages might also differ for different members of the group. For example, if the group of members of is an immediate family, the SMS handling instructions might indicate that copies of all outgoing and reply SMS messages sent from the children in the family also be sent to the parents. However, the call handling instructions might also indicate that the children are never to be copied on outgoing and/or reply messages sent from the parents.

The SMS message handling instructions might also be considered a default instruction that could be modified on a case by case basis by the person sending a reply message. For instance, the system might follow the SMS message handling instructions for reply messages unless the person sending a reply requests that the reply message be handled in a different fashion. Those special handling instructions could be specified by the user with a graphical user interface, or via speech based commands, as has been described above in connection with selecting an originating telephone number or billing account.

Likewise, a user group could establish a set of handling instructions that apply when a member of the group sends a SMS message to someone outside the group. And here again, those handling instructions could be considered default handling instructions that could be modified on a case by case basis by the person sending the SMS message.

In those instances where a user of a group is attempting to alter the default message handling instructions, the group might grant this permission to certain members of the group, but not to others. A permission to alter a default message handling rule could be allocated to the members of the group on a rule by rule basis and on a user by user basis. And the owner or account holder of the group might be the only user who can assign such permissions. In alternate embodiments, the owner or account holder might be able to assign the ability to grant such permissions to other members of the group.

In the case of outgoing and/or reply SMS messages, there would be a distinction between outgoing and reply messages that are to be delivered to telephone devices registered within the IP telephony service, and outgoing and reply SMS messages that are being sent to telephony device registered with other telephony service providers.

All SMS messages and reply messages generated by devices registered with the IP telephony service would first be sent to one of the XMPP servers 710, 712. The XMPP server would check to determine if the telephone number to which the SMS message is directed is one of the telephone numbers controlled by the IP telephony service, or a telephone number of a device registered with another telephony service.

If the message is being sent to a telephone number controlled by the IP telephony service, the XMPP server would then process the message in a fashion similar to how inbound SMS messages received from the SMS gateways are processed. If the SMS message is directed to a telephone number of a telephony device registered with another service, the XMPP server would send the SMS message to one of the SMS gateways for delivery through another telephony service.

In some instances a member of a group may wish to send a private SMS message to another member of the group. However, the system may also provide each group with a SMS "message board" that reflects all SMS messages that have recently been sent by all members of the group to all the other members of the group. The members of the group would be able to easily access and review the "message board." In some embodiments, the message board would be "threaded" to graphically illustrate the pattern of message and response from the members of the group. Also, the presentation of the messages may provide an indication to the user about which messages he has previously seen, and which are new since the last time the user viewed the message board. The message board would provide a convenient way for the members of the group to stay in touch with one another.

As is known to those skilled in the art, certain types of telephony devices, such as Apple iPhones, are configured to receive push messages that indicate the availability of some information. The SMS messaging system would be capable of sending such push messages to effect delivery of SMS messages to those devices.

A system as described above could also be used to deliver instant messages. It is common for a single user to be associated with multiple different instant messaging platforms. In this instance, a user could specify, within a first one of the instant messaging platforms, each of the other instant messaging platforms where the user has an instant messaging presence. Once that is done, whenever an instant message directed to the user is received by the first instant messaging platform, the first instant messaging platform would deliver the message to the user directly, and the first instant messaging platform would also cause the same message to be delivered through all of the other instant messaging platforms specified for the user.

Figure 9:
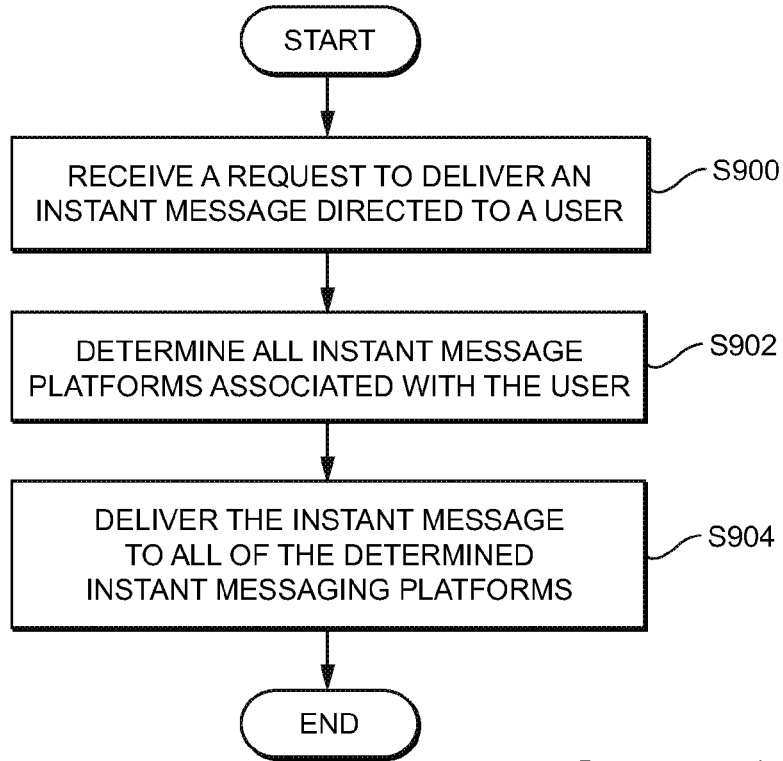
FIG. 9 is a diagram of steps of a method of delivering instant messages across multiple instant messaging platforms.

FIG. 9 illustrates a method which results in the delivery of an instant message through multiple different instant messaging platforms. As shown in FIG. 9, the method begins in step S900 where the system would receive a request to deliver an instant message directed to a particular user. In step S902, the system would check to determine if the user to which the instant message is directed is associated with a user group. If so, the system would determine all of the instant messaging platforms that are associated with that user group. In step S904, the system would then deliver the same instant message to all of the different instant messaging platforms that are associated with the user group.

Figure 10:
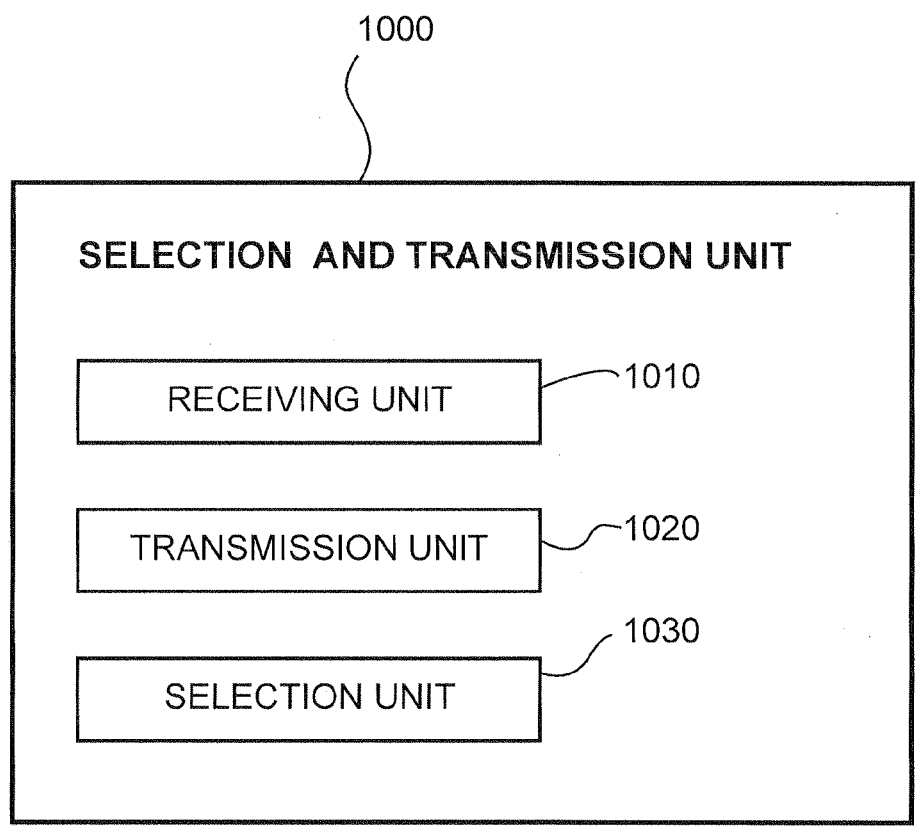
FIG. 10 is a diagram of a selection and transmission unit that is configured to receive a user's selection of an origination identifier and that is configured to transmit a communication using the selected origination identifier.

FIG. 10 illustrates a selection and transmission unit 1000 that is configured to perform the methods discussed above. The selection and transmission unit includes a receiving unit 1010 that receives an indication from a user of a communications device that is associated with a plurality of origination identifiers as to which of the plurality of origination identifiers is to be used when a communication is sent from the communications device. The selection and transmission unit 1000 also includes a transmission unit 1020 that transmits a communication that originates from the user's communications device such that the communication uses the indicated origination identifier. The selection and transmission unit 1000 further includes a selection unit 1030 that causes a user to be presented with a list of origination identifiers that are associated with the user's communications device.

In the examples provided above, it was assumed that the users themselves would establish user groups, and that the telephone calls, SMS messages and instant messages would originate from private parties. However, the user group concepts explained above could be used by a IP service to deliver information, advertising content or other messages to selected groups of users.

A IP system could create user groups which are defined based on common aspects of the users. For example, the IP system could create a user group where all members of the user group are males between the ages of 20 and 30. The IP system could then periodically send information to the members of that group via audio recordings. This would be accomplished by ringing the group members' telephony devices, and when the users answer, playing an audio recording to the users. Information could also be delivered to members of the user group via SMS messages and/or instant messages. The messages sent to that user group would be tailored to be of particular interest to the user group.

Once the IP system establishes user groups based on demographics of the users, the IP system might also offer to deliver advertising messages to members of particular user groups on behalf of third party companies. Because the IP system would be able to deliver the advertising messages to targeted audiences, the IP system may be able to charge premium prices to deliver targeted advertisements to the user group members.

In many of the systems and methods described above, it is assumed that telephony devices or client devices will have software which is running on the device and which enables the device to interact with the IP telephony service elements to effect the systems and methods. The software for such devices could be downloaded to the telephony devices via many different ways. The software could be downloaded and installed via a memory device that couples to the telephony device, or such software could be downloaded via a network connection, either wired or wireless. Likewise, new and different software could be loaded upon a telephony device and caused to run whenever the system needs to install such software to effect a certain purpose. Similarly, software updates and revisions could be automatically loaded on such telephony devices upon the instruction of the IP telephony service, or upon the user's instructions.

Currently, when a user wishes to place a telephone call or wishes to send a SMS and/or MMS message, the user will use a telephone number to direct the communication to the appropriate party. It is anticipated that in the future, it may not be necessary to address such communications to the appropriate party or parties using a telephone number. Instead, it is anticipated that other forms of identifiers will be used to direct communications to the appropriate party or parties. Any reference herein, or in the following claims, to dialing a telephone number to place a telephone call or to sending a SMS or MMS message directed to particular telephone number is intended to also encompass sending such communications to an appropriate party or parties using any other form of identifier.

For example, in the foregoing description, members of a user group are able to initiate a telephone call to another member of the group by selecting an alias for the other member on a graphical user interface. Users may also be able to initiate telephone calls and/or send messages to other people using such aliases, or using any other form of identifier that uniquely identities a person, or a group of users.

In the foregoing description and in the following claims, references are made to various types of "units." The term unit is intended to encompass one or more devices that accomplish a particular function. Thus, a unit could be a single device that accomplishes a function, or a unit could be multiple devices that operate to accomplish a function. Where multiple devices make up a unit, those devices could be co-located, or located at completely different places. Likewise, multiple devices that make up a unit could be electronically or physically coupled to one another, or completely disconnected from each other. Further, the devices that make up a unit cold communicate with one another, or there could be virtually no communication between the devices.

While the technology has been described in connection with what is presently considered to be the most practical and preferred embodiments, it is to be understood that the technology is not to be limited to the disclosed embodiments, but on the contrary, is intended to cover various modifications and equivalent arrangements included within the spirit and scope of the appended claims.

What is claimed is:

1. A method of selecting and using an origination identifier in an Internet Protocol (IP) environment, comprising:
receiving an indication from a user of a communications device that is associated with a plurality of origination identifiers as to which of the plurality of origination identifiers is to be used when a communication is sent from the communications device;
transmitting a communication that originates from the user's communications device such that the communication uses the indicated origination identifier; and
transmitting the indicated origination identifier with the communication, wherein
the communication includes a message, and
transmitting the communication includes, at least, transmitting a message that originates from the user's communications device such that the message reflects the indicated origination identifier, the message configured to include text-based communication.

2. The method of claim 1, wherein the receiving step comprises receiving an indication from the user that one of the plurality of origination identifiers is to be used as a default origination identifier unless the user specifically requests that a different origination identifier be used, and wherein the transmitting step comprises using the default origination identifier unless the user specifically requests that a different origination identifier be used.

3. The method of claim 2, further comprising receiving an indication from the user that an alternate origination identifier associated with the user's communication device is to be used for a communication, and wherein the transmitting step comprises transmitting a communication that originates from the user's communication device such that the communication uses the alternate origination identifier.

4. The method of claim 1, wherein the plurality of origination identifiers comprise a plurality of telephone numbers, wherein the receiving step comprises receiving an indication from the user as to which of the plurality of telephone numbers is to be used as an originating telephone number when a communication is sent from the user's communications device, and wherein the transmitting step comprises transmitting a communication that originates from the user's communications device such that the communication reflects the indicated originating telephone number.

5. The method of claim 1, further comprising presenting the user with a list of origination identifiers that are associated with the user's communications device.

6. The method of claim 5, wherein the presenting step comprises causing a display screen of the user's communications device to display a list of origination identifiers associated with the user's communications device such that the user can select one of the origination identifiers, and wherein the receiving step comprises receiving an indication of which of the displayed origination identifiers was selected by the user.

7. The method of claim 1, wherein the transmitting step comprises causing an account associated with the indicated originating identifier to be charged for the communication that originates from the user's communications device.

8. The method of claim 1, wherein the indicated origination identifier provides information capable of identifying the user when the information is displayed on a different communications device.

9. The method of claim 1, wherein the origination identifier can be associated with the communications device and/or an application executed by the communications device.

10. The method of claim 1, wherein the origination identifier is associated to one or more user groups and the origination identifier is capable of identifying the one or more user groups.

11. A system for selecting and using an origination identifier in an Internet Protocol (IP) environment, comprising:
means for receiving an indication from a user of a communications device that is associated with a plurality of origination identifiers as to which of the plurality of origination identifiers is to be used when a communication is sent from the communications device;
means for transmitting a communication that originates from the user's communications device such that the communication uses the indicated origination identifier; and
means for transmitting the indicated origination identifier with the communication, wherein
the communication includes a message, and
transmitting the communication includes, at least, transmitting a message that originates from the user's communications device such that the message reflects the indicated origination identifier, the message configured to include text-based communication.

12. A system for selecting and using an origination identifier in an Internet Protocol (IP) environment, comprising:
a receiving unit that receives an indication from a user of a communications device that is associated with a plurality of origination identifiers as to which of the plurality of origination identifiers is to be used when a communication is sent from the communications device; and
a transmission unit that transmits a communication that originates from the user's communications device such that the communication uses the indicated origination identifier and transmits the indicated origination identifier with the communication, wherein
the communication includes a message, and
transmitting the communication includes, at least, transmitting a message that originates from the user's communications device such that the message reflects the indicated origination identifier, the message configured to include text-based communication.

13. The system of claim 12, wherein the receiving unit receives an indication from the user that one of the plurality of origination identifiers is to be used as a default origination identifier unless the user specifically requests that a different origination identifier be used, and wherein the transmission unit transmits a communication originating from the user's communications device such that the communication reflects the default origination identifier unless the user specifically requests that a different origination identifier be used.

14. The system of claim 13, wherein the receiving unit also receives an indication from the user that an alternate origination identifier associated with the user's communication device is to be used for a communication, and wherein the transmission unit transmits a communication that originates from the user's communication device such that the communication uses the alternate origination identifier.

15. The system of claim 12, wherein the plurality of origination identifiers comprise a plurality of telephone numbers, wherein the receiving unit receives an indication from the user as to which of the plurality of telephone numbers is to be used as an originating telephone number when a communication is sent from the user's communications device, and wherein the transmission unit transmits a communication that originates from the user's communications device such that the communication reflects the indicated originating telephone number.

16. The system of claim 12, further comprising a selection unit that causes the user to be presented with a list of origination identifiers that are associated with the user's communications device.

17. The system of claim 16, wherein the selection unit causes a display screen of the user's communications device to display a list of origination identifiers associated with the user's communications device such that the user can select one of the origination identifiers, and wherein the receiving unit receives an indication of which of the displayed origination identifiers was selected by the user.

18. The system of claim 12, wherein the transmission unit causes an account associated with the indicated originating identifier to be charged for the communication that originates from the user's communications device.

19. In a system where a plurality of origination identifiers are associated with a user's communications device and where the user has indicated that one of the plurality of origination identifiers is a default origination identifier, a method of deciding which origination identifier to use when a communication is to be sent from the user's communications device, the method comprising:
determining if the user has requested that an alternate origination identifier be used;
deciding to use the default origination identifier if the user has not requested that an alternate origination identifier be used;
deciding to use the alternate origination identifier if it is determined that the user has requested that the alternate origination identifier be used; and transmitting the decided origination identifier when the communication is sent from the communications device, wherein the communication includes a message, and sending the communication from the communications device includes, at least, transmitting a message that originates from the user's communications device such that the message reflects the decided origination identifier, the message configured to include text-based communication.

* * * * *